United States Patent [19]

Levis et al.

[11] Patent Number: 4,734,779

[45] Date of Patent: Mar. 29, 1988

[54] VIDEO PROJECTION SYSTEM

[75] Inventors: Maurice E. Levis, New York, N.Y.; Ralph Carmen, Lebanon, N.J.

[73] Assignee: Video Matrix Corporation, Hackensack, N.J.

[21] Appl. No.: 59,790

[22] Filed: Jun. 8, 1987

Related U.S. Application Data

[63] Continuation-in-part of Ser. No. 886,728, Jul. 18, 1986, abandoned.

[51] Int. Cl.[4] .......................... H04N 9/16; H04N 7/18
[52] U.S. Cl. ........................................ 358/231; 358/64; 358/87; 358/93; 358/104; 353/30; 340/720
[58] Field of Search .................... 358/87, 93, 104, 108, 358/231, 64; 340/705, 717, 720; 353/30, 31, 32, 34, 38

[56] References Cited

U.S. PATENT DOCUMENTS

| | | | |
|---|---|---|---|
| 3,256,386 | 6/1966 | Merchand | 358/93 |
| 3,909,525 | 9/1975 | Fagan | 358/87 |
| 3,932,702 | 1/1976 | Shelley et al. | 358/87 |
| 3,995,288 | 11/1976 | Yevick | 353/30 |
| 4,355,328 | 10/1982 | Kulik | 358/87 |
| 4,386,485 | 1/1983 | Midland | 340/720 |

Primary Examiner—Howard W. Britton
Assistant Examiner—John K. Peng
Attorney, Agent, or Firm—Eliot S. Gerber

[57] ABSTRACT

A large screen video display system to display bright video images at high resolution comprises an array of video monitors arranged adjacent each other in a compact matrix, for example, an array of 2×2, 3×3 or 4×4 video monitors. A lenticular optical plate is placed in front of the face plate of each monitor to magnify the video images and project them as a mosaic of images on the back face of a rear projection screen. Circuit means electronically, using digital techniques, divide the original video image into segments, each segment being displayed on a separate monitor, and into sub-segments, for example, 48 rectangular sub-segments, which sub-segments are individually rotated 180° about the image axis on each monitor. A viewer looking at the video image displayed on the front of the RP projection screen sees a continuous image covering the entire screen and is not aware that the image is made up from sub-segments and segments displayed on individual monitors.

15 Claims, 15 Drawing Figures

VIDEO PROJECTION SYSTEM

This application is a continuation-in-part application based upon application Ser. No. 886,728, filed July 18, 1986 for "Video Projection System", now abandoned.

BACKGROUND OF THE INVENTION

The present invention relates to large screen high resolution video displays for displaying a large and bright video image, for example, for public entertainment, industrial shows, computer image displays and other uses.

During 1985 a number of companies, mainly in Europe, have started marketing arrays of CRT-based (cathode ray tube) video monitors mounted in a variety of matrix geometries, such as 4×4 (whose overall image may be 6.6 feet by 5.0 feet), 3×3, 2×2, and also larger arrays involving as many as 200 or more monitors. The audience views directly the front faces of the video monitors. These video array systems are capable of creating multi-image effects involving the entire matrix of CRT's using electronic digital image processing circuits. The user may present a single image covering the entire array or the same image on each individual CRT, or any combination of image/CRT displays. Examples of such video array systems are as follows: The "Vidiwall" (TM) of Philips of Holland, which is driven by a laser videodisk system using a large number of laser videodisks; a system marketed by TC Studios of West Germany, whose video array is driven by a ¾" VTR (video tape recorder); a system marketed by Nurnberger Medientechnik GmbH (Tele-Wall Delcom 256 Model) of West Germany, also operated by ¾" VTR on laser disks; and systems marketed by Electrosonic ("Videowall" TM) of Minneapolis, Minn. Electrosonic markets video systems which are both ¾" VTR or laser video disk sources. Furthermore, there are several custom-made systems in various places, mainly discotheques, around the United States and Europe.

In general, those video array systems have various shortcomings. When the array of monitors is positioned side-by-side and on top of each other to form a closely packed matrix, there are mechanical limitations as to how close the video images displayed on each monitor can be moved to each other. Even when closely packed together, there is a dark seam between the images formed on the monitors. That seam is formed by the front edge frames of the video monitors. Using the flattest and squarest CRT's presently available, this seam width is still at least two inches (50.8 cm) between adjacent monitors and around each monitor image. In such arrays of CRT's, there are seams between the various sections of the overall image, so that the image appears as if it originated behind a grill. Another shortcoming of a number of existing systems is that they are operated through computer controlled laser disk programming. To produce a "master" suitable for laser disks and then to produce programs on laser disks is both expensive and time-consuming. In some array systems each monitor is operated by its own laser video disk system, which is expensive and difficult to operate. Other shortcomings relate to the quality of the video image.

A video array system, without seams and with relatively inexpensive electronics, for digital image processing from a VTR/VCR (video cassette recorder) would have technical and commercial advantages over the above-described systems. In displays used for entertainment, merchandising, computer image display and business presentations, it is important that the final image, seen by the audience, be without seams and that the display may be programmed using a relatively inexpensive single video source, such as a single VTR/VCR, a video camera or computer sources, instead of laser video disks. Other advantages with commercial merit involve image quality, image enhancement, elimination of monitor drift, jitter and over-scanning, and brightness.

OBJECTIVES AND FEATURES OF THE INVENTION

It is an objective of the present invention to provide a large-screen high-resolution video display system which has a bright, clear image without seams, which display system may be programmed using a single source of video signals, such as video tape or camera.

It is a further objective of the present invention to provide such a video display system which uses conventional, mass-produced video monitors, so that the system is relatively inexpensive and reliable.

It is a further objective of the present invention to provide such a video display system which uses digital electronic circuitry to convert the original analog video signal into digital form for storage and manipulation, to provide image segments and sub-segments, and to convert the stored digital signals to analog video signals for display, in image segments and sub-segments, on the video monitor screens.

It is a further objective of the present invention to provide such a video display system which is adapted to be used with various sizes of video monitors and to various sizes of video monitor arrays.

It is a further objective of the present invention to provide such a video display system which, in one embodiment, uses relatively low cost and yet optically accurate lens elements of the projection lens type.

It is a feature of the present invention to provide a large screen video display system which displays video images to an audience that views the front face of a rear projection screen. The system includes a plurality of at least four video monitors arranged adjacent each other to form a matrix array of said monitors. For example, an array may be a 2×2, 3×3 or 4×4 array. The monitors may be conventional CRT video monitors. A lenticular optical plate is positioned in front of the face of each monitor. The optical plate comprises a plurality of lens elements positioned side-by-side.

The system further includes segmenting electronic digital circuit means to divide the original analog video image into segments so that each segment is displayed on a respective one of the video monitors, and sub-segment electronic digital circuit means to divide each of the segments into a plurality of video image sub-segments. The sub-segments are displayed on each of the video monitors and correspond, in location and number, to the lens elements of the optical plate in front of its monitor. The lens elements project the images of the sub-segments on the rear-surface of a rear projection screen having a rear surface and a front surface. The final image viewed by the audience appears on the front surface. The sub-segment images are combined on the screen to form a unitary video image of high resolution and without seams.

It is a further feature of the present invention that each of the sub-segments on the monitor face is rotated 180° about the optical axis through its center from its image when viewed on the front of the screen, so that the lens elements may be projection-type lens elements.

BRIEF DESCRIPTION OF THE DRAWINGS

Other objectives and features of the present invention will be apparent from the following detailed description taken in conjunction with the accompanying drawings.

In the drawings.

SUMMARY OF THE INVENTION

The objectives of the present invention are accomplished by mounting individual video monitors so that they are arrayed in a matrix form side-by-side and/or one on top of each other. The display is composed of an array of state-of-the-art video monitors arranged in a matrix formation, for example, a 2×2 or 3×3 array. An optical face plate system is placed in front of the monitor matrix covering the entire array, thus making it appear that the display is a single large video screen rather than a matrix of smaller individual video monitors. Such a monitor matrix, in combination with special digital electronic circuits, a lenticular magnifying lens element array and a rear projection screen ("RP"), operates, as viewed from the audience side of the RP screen, as a single large video screen. Each lens element of the lenticular lens plate projects a small rectangle of an image from its video monitor onto the RP screen. The original video image is broken up to segments, by the electronic circuit, so that each segment appears on its individual video monitor. Preferably, each image on each monitor is broken up, by the electronic circuit, into a mosaic of small subsegments which are squares (or rectangles) separated by non-image gaps and with each sub-segment rotated 180° about its optical axis. For example, in a 2×2 array there are four segments (one for each monitor) and each segment is broken up to 4 or more sub-segments. The mosaic is recreated as a single upright image on the front face of the rear projector ("RP") screen. The image segmentation and sub-segmentation is performed through the use of special digital processing circuits. The non-image gaps between the sub-segments are blank spaces.

DETAILED DESCRIPTION OF THE INVENTION

The System as an Array of Monitor Modules

The system of this invention is called the "VMX" display (TM). The VMX display is composed of a number of video monitors (CRT's) arrayed in a matrix form. Each "CRT" forms an individual video monitor module. The term "CRT", as used in this context, refers to conventional cathode ray tube (CRT) color video monitors, although alternatively other types of TV or video monitors may be used such as liquid crystal panels or plasma panels. The VMX display can be considered an array of CRT modules forming a matrix of screens that butt each other, but the display is without seams as the image is seen by the audience.

Figure 1:
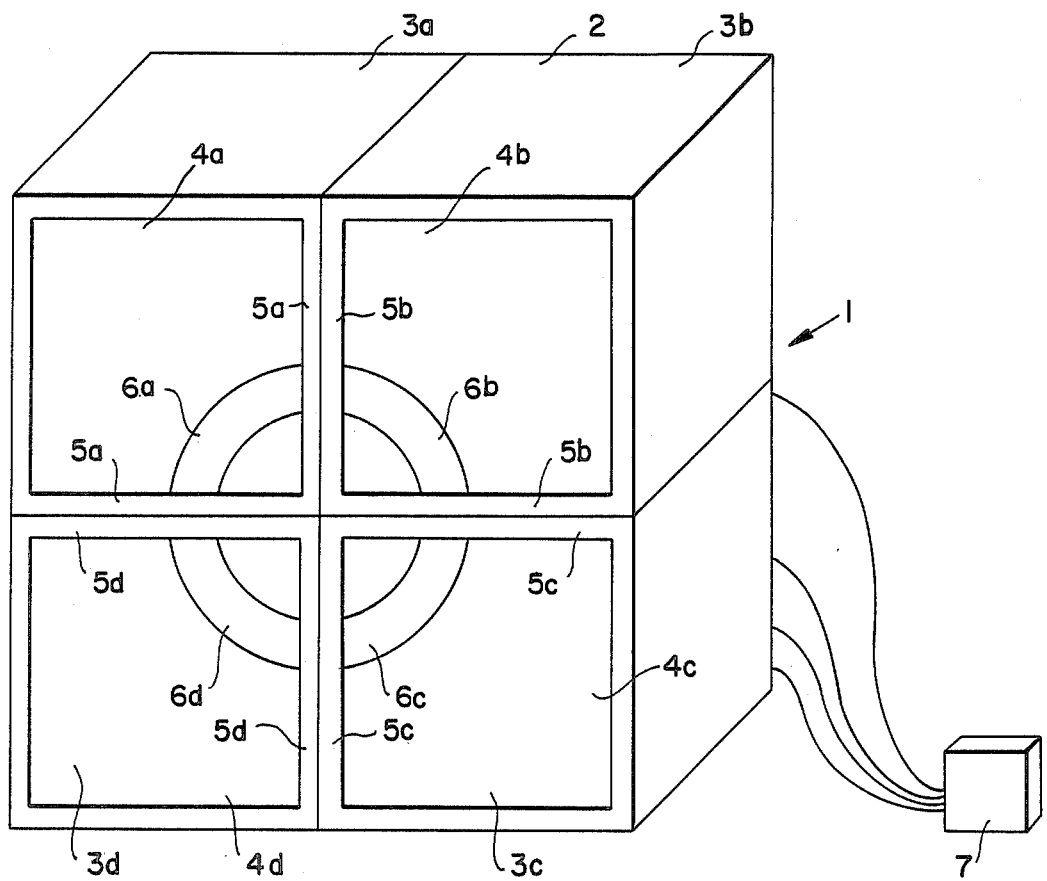
FIG. 1 is a perspective view of an array of monitors according to the prior art.

As shown in FIG. 1, an array of monitors according to prior art utilizes four video monitors 3a–3d. FIG. 1 shows the arrangement of the monitors and not the entire system. In FIG. 1 the array is shown as a 2×2 array in two rows and two columns. The monitors 3a–3d butt each other and are as closely packed as possible. Each monitor 3a–3d shows a CRT screen face plate 4a–4d and each has a frame 5a–5d around its respective CRT face plate 4a–4d. The butting frames 5a–5d form seams between the CRT face plates 4a–4d. The arabic number zero "0" is shown as it would be divided into four segments 6a–6d for display on the four CRT face plates 4a–4d. The division into segments is by electronic digital circuitry 7 to which each monitor 3a–3d electrically connected and controlled. The controller 7 receives the original video image and sound, from a single VTR/VCR, over-the-air broadcast from a cable TV signal or other sources, and divides it using digital techniques (explained above) into segments for each monitor. No sub-segments are created in the prior art systems.

Each monitor 3a–3d forms part of a separate module, so that for a 2×2 array there are four monitor modules.

Figure 2:
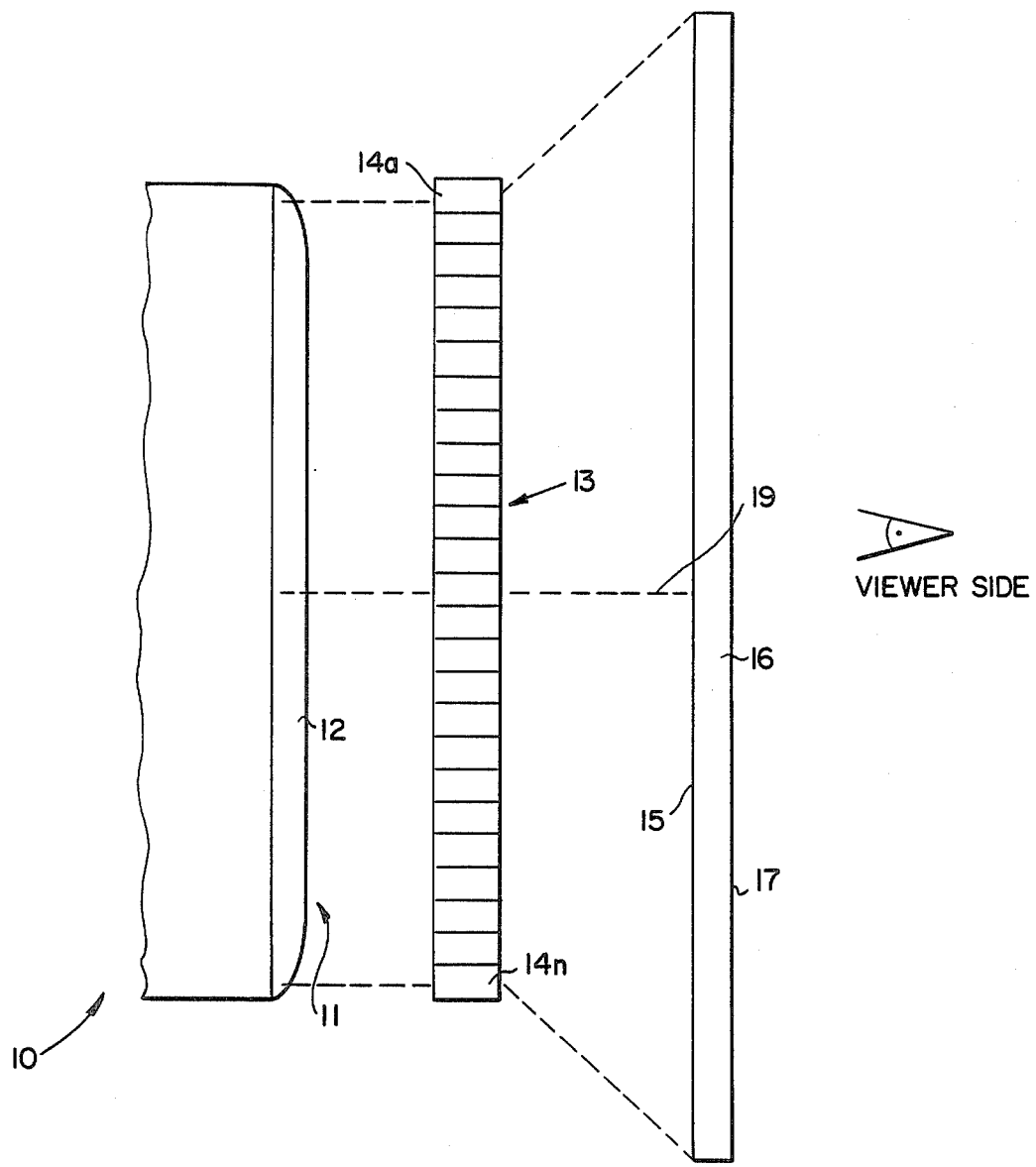
FIG. 2 is a side cross-sectional view of a portion of one monitor, its associated lenticular plate and a portion of the rear projection screen.

FIG. 2 shows the basic elements of a single VMX module. The face of a video monitor CRT 10 is depicted being cut-away to show the face plate phosphor/mask plane on which the video image is formed by a scanning electronic beam or beams. The front 11 of the CRT 10 is covered by a thick glass front face plate 12, which is the front face of a conventional CRT (TV) tube of a video monitor. A lenticular plate 13 is positioned a short distance in front of the CRT face 12, typically from flash to three inches (0 to 7.62 mm). The lenticular plate 13 is made up of an array of lens elements 14a–14n arranged side-by-side in a support plate.

Each lens element 14–14n is composed of a single, or preferably a number of, individual lenses. The subscript "N" here means a number typically larger than 4, for example, 16 or more. These lenses 14a–14n cover the image displayed on the face plate 12. Each lens element 14a–14n views a small square or rectangular sub-segment of the entire segment of the image on the monitor. Preferably the CRT image is broken up into a mosaic of sub-segments separated by non-image space (blank gaps). Each lens element 14a–14n in the lens array 13 magnifies its object field, i.e., its sub-segment and projects it into the rear face 25 of the rear projection ("RP") screen 16. A viewer at the front face 17 of the RP screen 15 will be able to see a full, continuous image made up of a mosaic of images projected by the individual lens elements.

The arrangement in FIG. 2 is simplified considerably and is only intended to be used for the purpose of identifying the major components of the VMX display module. In order to form the magnified image in this configuration, the lens elements cannot be parallel to each other. In order to reform the image mosaic magnified on the RP screen, each lens element must be at a slight angle to the central element. The central lens element is the only one aligned with the central optical axis 19 of the CRT tube. The optical axis 19 is perpendicular to the CRT face and the RP screen plate. All the other lens elements are tilted away from the central axis 19 at gradually larger angles as one goes from the optical axis 19 to the edges of the lenticular plate 13.

The Optical Considerations of the Lenticular Plate

Figure 3:
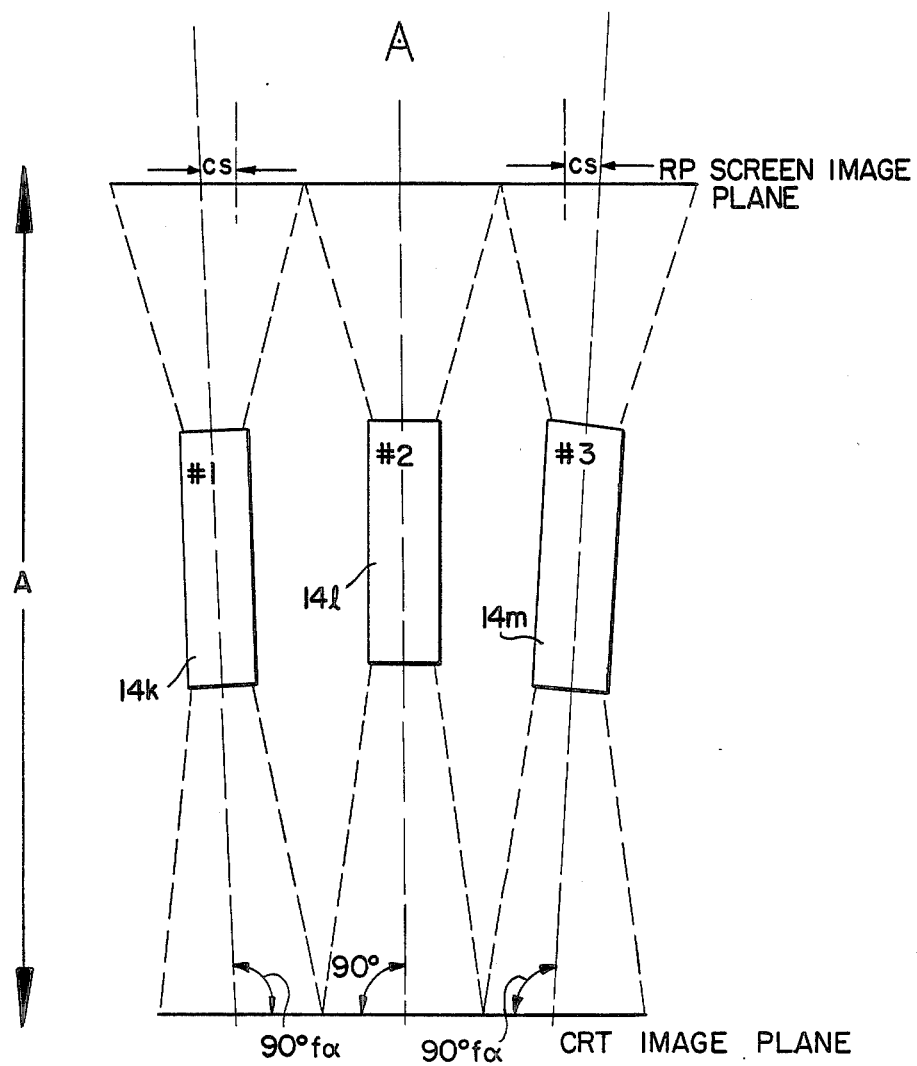
FIG. 3 is a top plan view showing three lens elements of the lenticular plate, and portions of the CRT image plane and the rear projection screen.

FIG. 3 is an enlarged drawing showing the relationship between three contiguous lens elements 14h, 14l, 14m that form part of the lenticular plate 13. The central lens element 14l is aligned with the central axis 19. The images on the RP screen 16 are magnified, preferably by about 1.2. The center of these magnified images are shifted by the distance CS from where their vertical axis would have been on the RP screen if the image relationship was 1 to 1. The angle of shift from the normal, $\alpha$, is given by:

$$\alpha = \arctan(CS/D) \qquad (i)$$

where D is the distance between the CRT 11 and RP 16 image planes.

For a typical situation where D = 10 inches (25.4 cm) the square image (the sub-segment image) on the CRT is $1'' \times 1''$; the magnification is 1.2, making the RP image squares $1.2'' \times 1.2''$ and the shift CS for two contiguous elements around the central element as depicted in FIG. 2 is 0.2". This angle has to be increased for lens elements further away from the central element 14l in order to form the magnified image mosaic on the RP screen. Assuming again $1'' \times 1''$ image squares on the CRT image plane 11, and assuming a 25" diagonal video monitor 10 that has an image 20 inches wide and 15 inches high, one would need roughly 10 lens elements out from the center to cover the extreme edge of the CRT image, a total of about 300 lens elements for the one video monitor. The angle $\alpha$ of the tenth element will be 11.3 degrees.

The desired image projected by the lens elements on the RP screen 16 should maintain the resolution of the image displayed on the CRT 10. The CRT resolution is defined by the distance between the centers of pixel elements on the CRT face. For monitor quality mass-produced CRT's, having resolution of roughly $640 \times 480$ pixels, and a diagonal dimension of 15" minimum, the resolution must be about 0.5 mm (or better) to resolve individual pixels. A resolution of 0.5 mm as a target for system image quality is quite adequate. The lens elements must also have an adequate depth of focus so that when the elements are tilted relative to the vertical axis, angle $\alpha$, and therefore relative to the image planes of the CRT 10 and RP 17, the images remain in focus.

Figure 4:
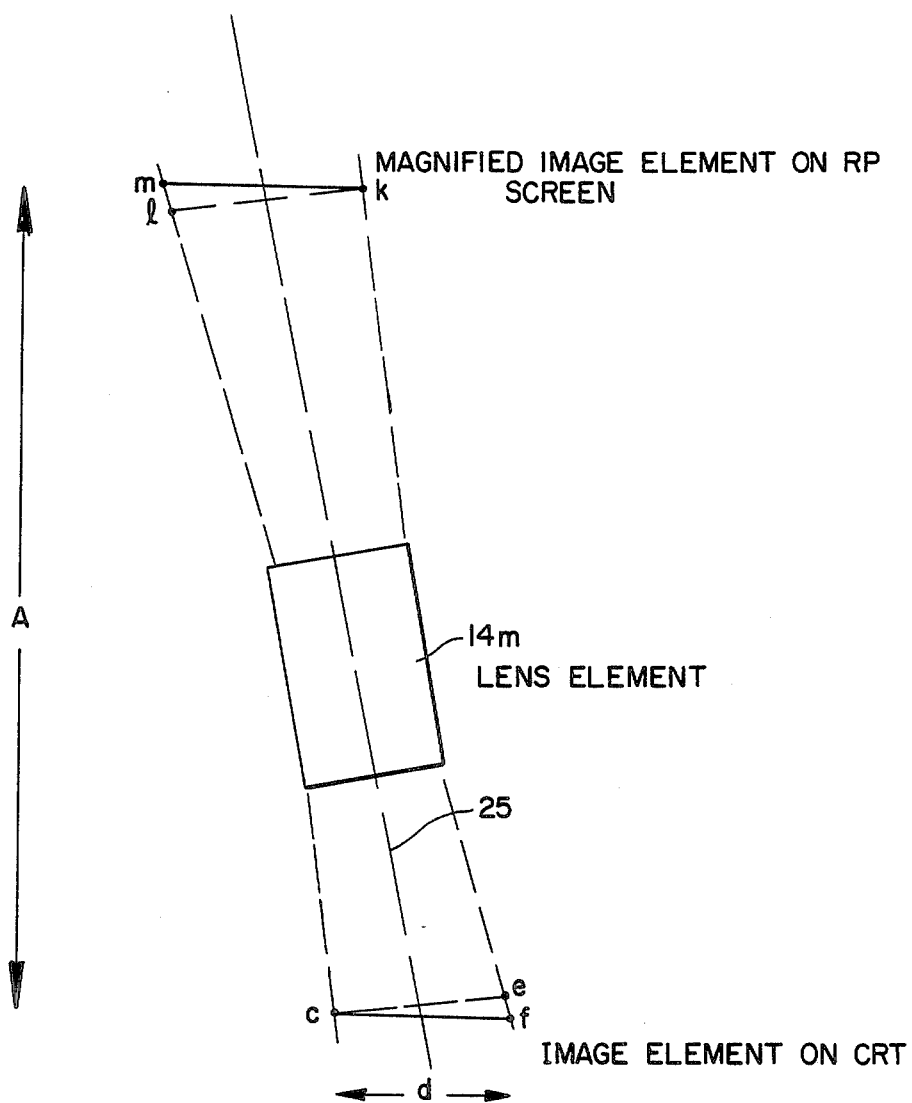
FIG. 4 is a top plan view of one lens element of the lenticular plate showing the relationship, to the depth of field considerations, of the images on the CRT and the rear projection screen.

A visualization of the depth of focus (and depth of field) requirements is shown in FIG. 4. The lens element 14m, taken as a typical off-axis lens element, in FIG. 4, is aligned with the lens element optical axis 25 connecting the center of the image sub-segment on the CRT with the center of the corresponding image sub-segment on the RP screen. Each lens element 14a–14n has its own lens element optical axis which is a different axis for each lens element. The assumption in FIG. 4 is that the RP image center is displaced by approximately the width of the CRT image sub-segment from the center of the CRT image sub-segment, a typical geometry for a lens element which lies between the central lens element and an edge lens element. The image plane of the lens element 14m is tilted an angle mkl from the plane of the RP image.

Figure 5:
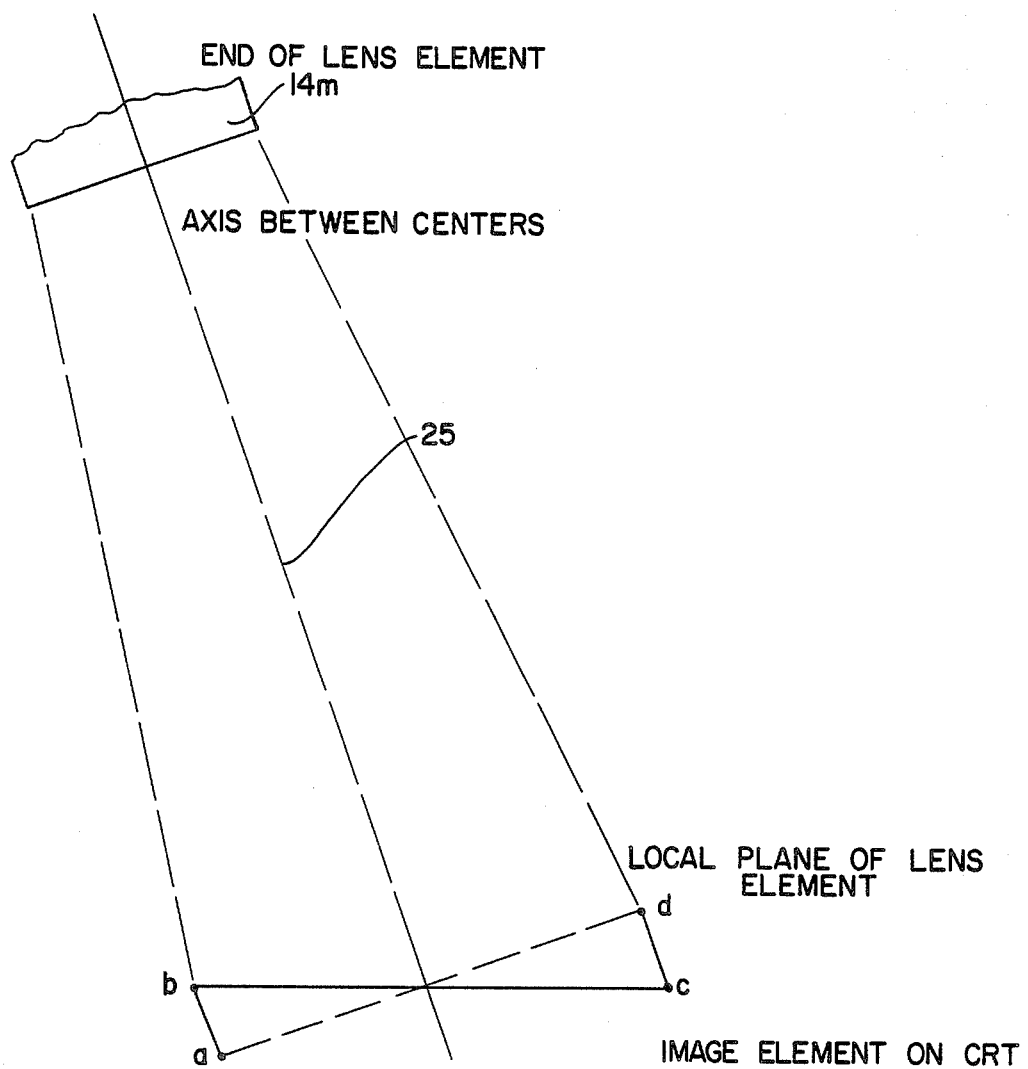
FIG. 5 is a view, similar to FIG. 4, showing details of the depth of field considerations of the lens elements.

FIG. 5 shows in greater detail the geometry of the image formation of the CRT image plane. The focal plane of lens element 14m is located so that it intersects the CRT image element plane near its center. The depth of focus requirement is that the lens maintain a sufficient focus, for distances in the order of ab or cd away from the focal plane, to have a resolution of at least 0.5 mm.

So far, consideration has been given to the tilting of the lens element required to optically project a mosaic of sub-segment images from the CRT face to the RP screen. The requirement that each sub-segment element of the mosaic is magnified slightly (roughly 1.1 to 1.5 times) makes it necessary that the lens elements are tilted at progressively larger angles away from the vertical axis as one moves towards the edges of the CRT image. Another requirement, however, is that each lens element have slightly different object and image lengths. It is clear from FIGS. 4 and 5 that for each tilted lens element the axial distance D along which the lens element is aligned, and defined by the center of the CRT and corresponding RP image elements is progressively longer as one moves to larger tilt angles (from the center of the CRT towards the edges of the CRT display). The lens elements are designed so that this variable (different object and image lengths) is taken into account. The above considerations apply to CRT/RP configurations where both the CRT and RP image planes are flat and parallel. The tilt depth of focus and variable distance to image planes considerations for the lens elements are eased considerably with alterations in the CRT and RP image planes and disposition. Both the face of the CRT tubes and the rear face of the RP screen are generally curved in two directions.

In addition, since the distances D will vary slightly, depending on the location of the lens elements, the magnification will also vary slightly. Alternatively, and preferably, the magnification will be uniform and the sizes of the sub-segment images will be slightly adjusted by the digital circuitry, to provide that the sub-segement images on the RP screen are uniform in size.

Figure 6:
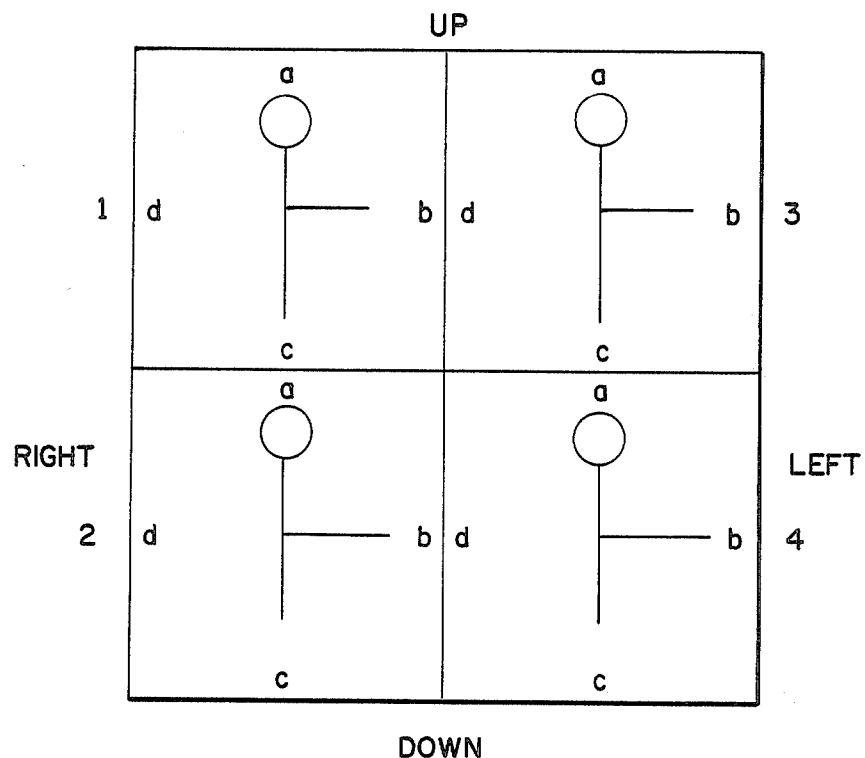
FIG. 6 is a front plan view showing four image sub-segments as they appear on the face plate of a CRT monitor.
Figure 7:
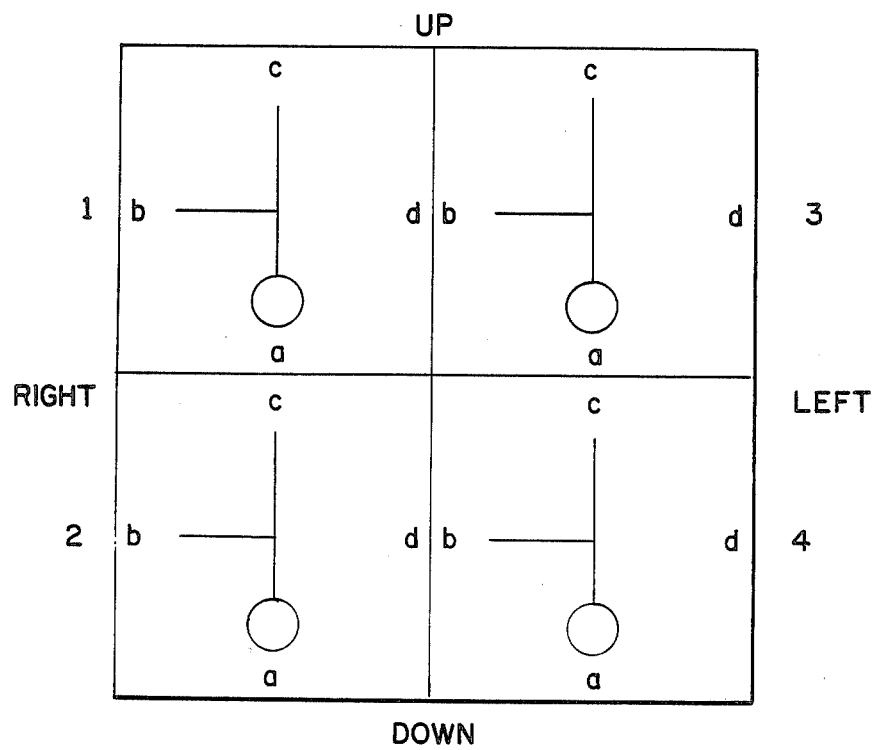
FIG. 7 is similar to FIG. 6, but shows the four image sub-segments as seen by the viewer on the front face of the rear projection screen.

The lenses incorporated into the lens elements 14a–14n of the lenticular plate 13, which project an image from the face of the CRT onto the RP screen, preferably act in the same manner as a slide projection lens. A slide projector lens projects and magnifies the image recorded on a slide and makes it appear on an RP screen rotated by 180° about the optical axis. For this reason, slides are placed, in the film gate, rotated by 180° so that the projected image (for RP projection in this example) is right side up and correct left to right. If, therefore, one started with four sub-segment image elements on the CRT face, as shown in FIG. 6, the individual lens elements would pick up each sub-segment element individually, magnify and project it on the RP screen rotated by 180°, as shown in FIG. 7, so that the viewer sees the mosaic as shown in FIG. 7. The sides that butt on the CRT display (FIG. 6) are (1b:3d), (1c:2a), (3c:4a) and (2b:4d). In FIG. 7 the reconstructed moasic on the RP screen does not butt the same way as the original mosaic on the CRT display, since upon projection the image sub-segment elements have been rotated by 180°.

The lenticular optical system described in FIG. 2 would not work using ordinary projection lens elements, unless one of two alternatives are used. One alternative is to use lens elements that do not rotate an image for RP projection, even though they magnify it. For example, a gradient index lens array with uneven fractional pitches (e.g. 0.23P, 029P) can image an object over a range of magnifications providing an erect real image. Such gradient index lens arrays are at present expensive and not very efficient in light transfer. A patent has been granted (U.S. Pat. No. 4,331,880; May 25, 1982, to J. D. Rees et al, assigned to Xerox Corp.) for a gradient index lens array that provides reduction or enlargement capabilities on copiers where only a single line of text at a time is viewed. Another alternative is a traditional lens element using a number of extra component lenses to produce an erect and non-reversed magnified image at the RP screen. However, serious problems arise regarding the cost, performance and light transfer efficiency of such lenses.

Preferably, the problem of image rotation is handled electronically so that the lens elements may be relatively simple and inexpensive. A digital image processing system, described in detail below, manipulates each sub-segment image element on the CRT in the same manner that one handles single slides in a slide projector. That is, the segment image is broken up into a mosaic of sub-segment image elements and each sub-segment element individually is rotated 180° electronically so that it appears inverted and reversed on the face of the monitor. When the mosaic of sub-segments is projected and magnified, the image is reconstructed correctly on the RP screen, provided that the sub-segments are exactly butted on each of their sides, the magnification is exactly uniform, and there is no shift in color, intensity, etc. as between sub-segments. In effect, the procedure depicted in FIGS. 6 and 7 would be reversed. FIG. 7 would depict, in this invention, the CRT image mosaic and FIG. 6 would depict the reconstructed mosaic on the RP screen.

Alternatively, in a situation where only full monitor segments were created, all of the CRT monitors may be rotated by 180° (turned upside-down) (not shown). This will cause the full image on the monitor face plates to be inverted (up-and-down reversal) and reversed (right-to-left reversal) without image rotation manipulation by the digital circuitry. This approach would only work if one uses an array of monitors with only one image segment per monitor. In order for this approach to work where sub-segments are used, the scan sequence has to be reversed so that the final image mosaic composed on the RP screen is correctly depicted.

Construction of Image Sub-Segment Element Mosaic on the CRT Display

Figure 8:
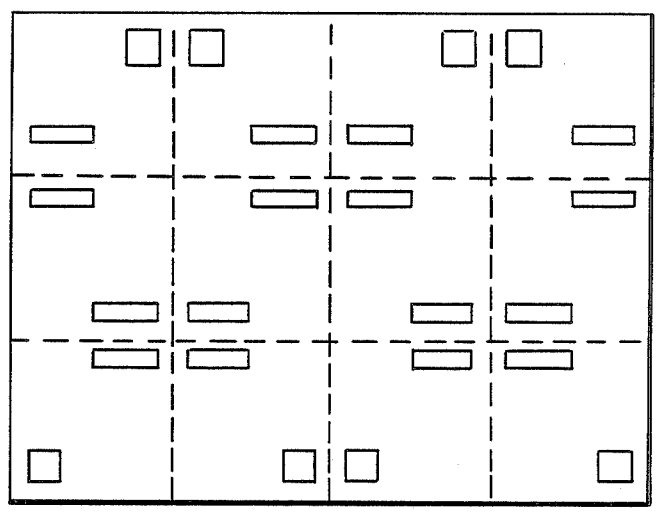
FIG. 8 is a front plan view showing a mosaic of unprocessed image sub-segments on the front face of the CRT monitor.
Figure 9:
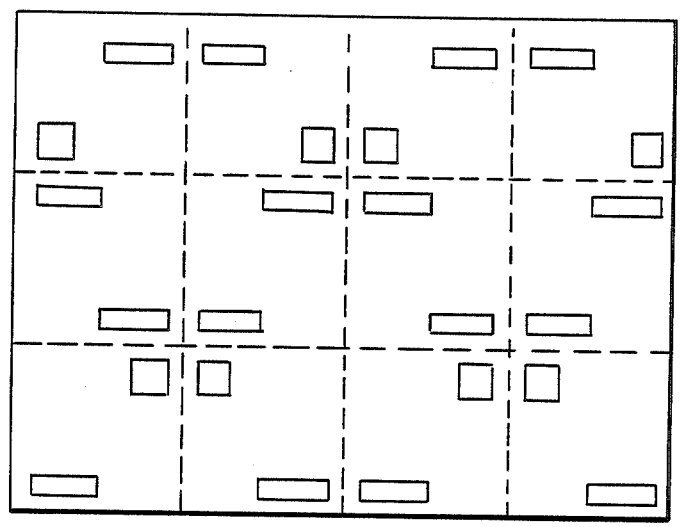
FIG. 9 is a front plan view, similar to FIG. 8, but showing the image sub-segments on the front face of the CRT monitor after processing.

The simplest way to form a mosaic of inverted flipped image elements on the CRT is to instruct the digital image processor to divide the image displayed on the CRT into a desired number of sub-segment elements, as depicted in one example in FIG. 8. The mosaic in FIG. 8 depicts the image elements prior to digital processing for inversion and flipping. The size, and therefore the number of the elements, depends on the array of projection optics. Optical considerations related to image quality will determine the proper size of each element on the mosaic. In the example of FIG. 8, a 5-inch diagonal video CRT display is broken up into an array of 12 sub-segment image elements, each one being a square 1"×1" image. The controller 7, upon being instructed to form the mosaic, will be further instructed to rotate by 180° each sub-segment image element in the mosaic. The resulting image is depicted in FIG. 9. Each sub-segment image element is picked up by a lens element 14a–14n (see FIGS. 2 and 5) and projected onto the face 15 of the RP screen 16. Each sub-segment image element will be again rotated by 180° optically by its lens element, so that the final image on the RP screen will be identical to the unprocessed image on the CRT display depicted in FIG. 8.

The example of an image mosaic shown in FIGS. 8 and 9 depicts only one possible scheme in the present invention involving a CRT display, a lenticular array of projection lenses and an RP screen. The CRT display can be replaced by other displays, the method of electronic imaging not being critical as long as the image could be manipulated in accordance with the requirements of the system. For example, flat panel video displays can be used using alternative imaging techniques, such as plasma, liquid crystal or other.

Another example is given regarding the CRT display based system discussed previously. In the depiction of FIG. 9 the video display is composed of 12 image elements that have been divided and rotated individually by 180° using digital images manipulations.

The mosaic has each element contiguous to the surrounding elements. The individual lens elements in the lens array image the mosaic onto the RP screen and are angled as shown in FIG. 3, i.e., the optical axis of each lens element, except the central lens element, is at an angle with respect to an imaginary central optical axis of its monitor. Since the projected image is magnified, each lens element is positioned to form its image element at angles that are progressively larger as one moves toward the edge of the display on the CRT. That requirement is considerably eased if the image elements forming the mosaic on the CRT display are shifted and separated by a short blank gap all around their edges. If the separation gaps are equal to the magnification required and the CRT image plane is completely flat (an idealization) then all the lens elements have their optical axes perpendicular to both the video image and the RP image planes. That approach could greatly simplify the manufacturing and alignment requirements.

Figure 10:
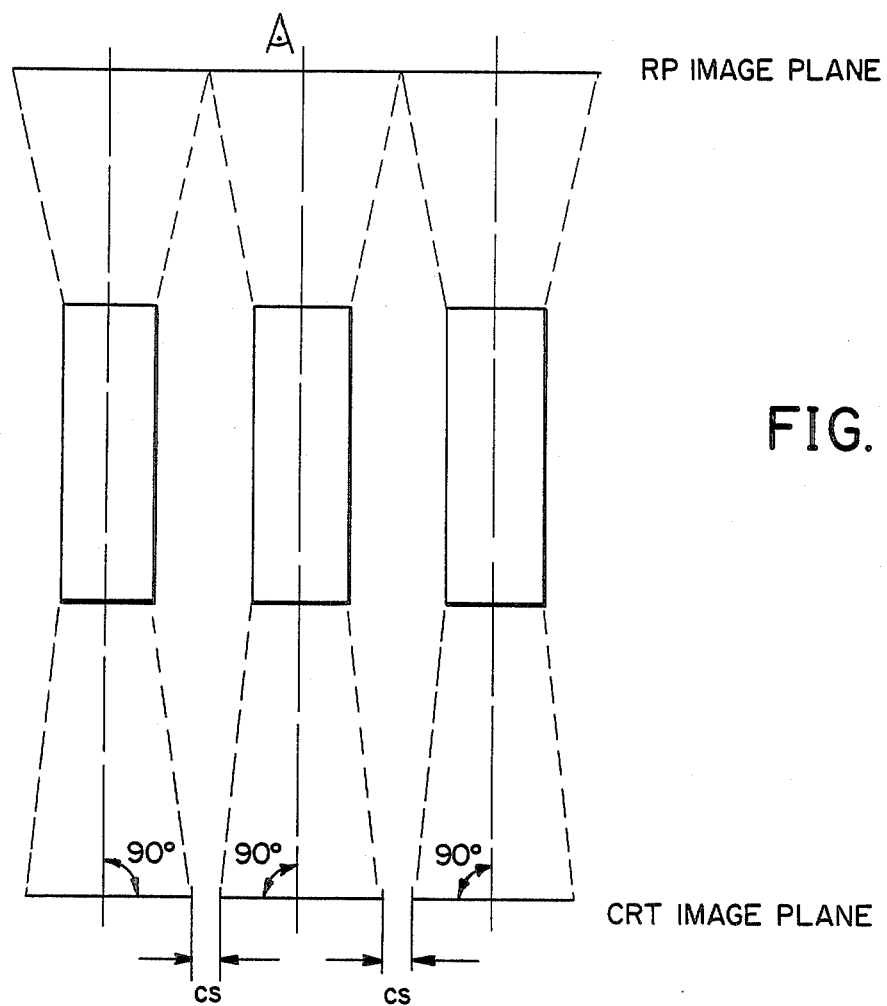
FIG. 10 is a top plan view showing details of three lens elements with separated sub-segmented images on the CRT image plane.

FIG. 3 depicts in detail three contiguous picture elements on the CRT display and the geometry of the image formation and magnification on the RP screen by three elements of the lens array. A magnification of approximately 1.2× is depicted. In FIG. 10 the same CRT display picture elements are depicted, except that now they have been separated by a distance equal to CS, the separation of image element centers on the CRT from the magnified elements on the RP image plane. Assuming the CRT and RP planes are flat and parallel, the lens elements depicted in FIG. 10 are all aligned with their optical axes vertical to the image planes, which simplifies the positioning of the lens elements.

However, present commercially available image planes are curved because the CRT face plate is curved in two directions. However, future CRT displays may be developed with flat image planes. There are CRT displays now available in the 26" diagonal size region that are relatively flat, for example, the Toshiba FST (TM) video monitor. An axis, vertical to the image, does not vary by more than 6 to 10 degrees tilt from center to diagonal edge using such monitors. That tilt is in the same direction that the lens elements are tilted, to form the magnified image mosaic, as shown in FIG. 3, and therefore helps the optical geometry.

The Design of the Lens Array and RP Screen

The lens elements are the individual projection lenses that make up the lens array, lenticular plate 13 (FIG. 2). Each lens element individually projects and magnifies an image element presented on the CRT face plate to produce high-quality images on the RP screen.

The projection lens elements preserve the pixel resolution of the CRT image. For CRT sizes of over 15" diagonal, a resolution of 0.5 mm is sufficient. A higher resolution does not enhance image quality, since the original CRT image sets the resolution limits.

Although theoretically a single element lens can be used to image a CRT image element on the RP screen, preferably each lens element should consist of matched, or nearly matched, lens doublets or triplets. Spherical aberrations can be minimized, and coma eliminated, for certain lens shapes, and distortion and chromatic aberration (lateral) can be minimized or eliminated using identical double lens geometries at the proper separation and with stops at the appropriate locations. As one possibility, doublets (pairs of plano-convex and (shallow/convex)-convex lenses have been tried and performed satisfactorily. Lens systems developed for video projection systems appropriately modified for VMX use would be very suitable for this application.

Figure 11:
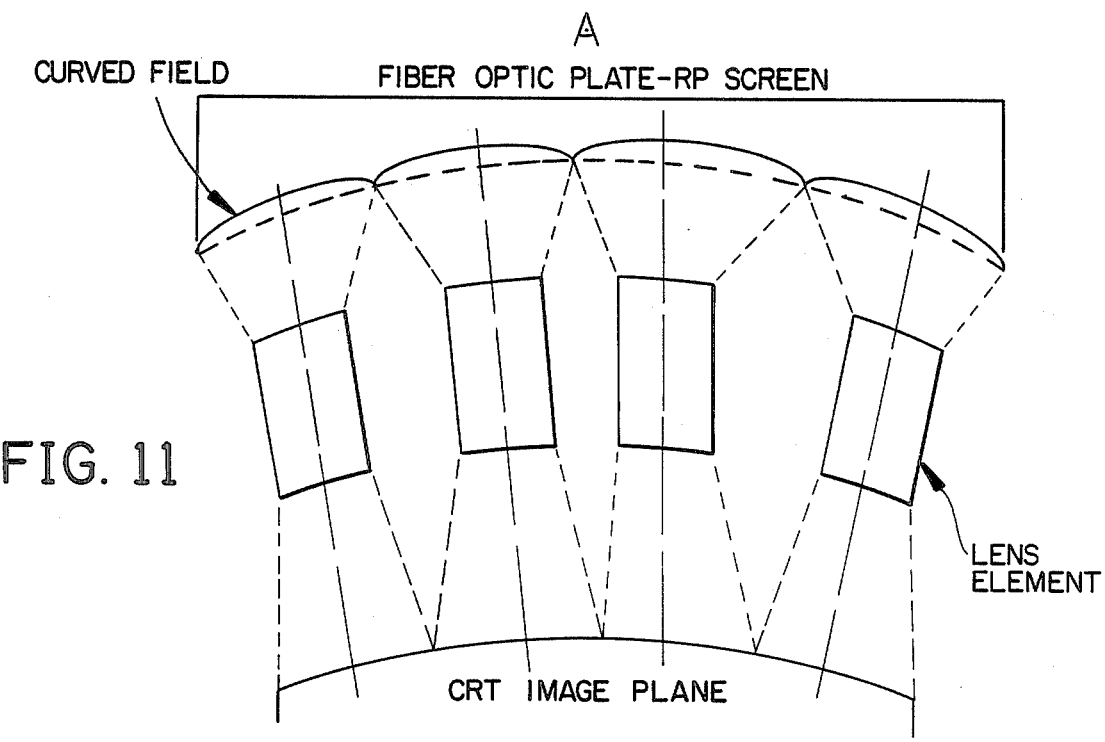
FIG. 11 is a top plan view showing four lens elements of the lenticular plate, the CRT image plane and a fiber optic plate which is a rear projection screen.

Preferably there is an important interaction between the RP screen and the projection lens elements (FIG. 11). The image projected by each of the lens elements is characterized by a curved field, a typical problem with most projection lenses. In order to eliminate astigmatism in a projected image, one can design the projection lens so that tangential and sagittal focal planes coincide with the Petzval surface, where one gets no astigmatism. The Petzval surface has a paraboloidal curvature. The RP screen preferably has a pattern of paraboloidal cavities on its back surface, one for each lens element, thus matching the Petzval field of curvature and thereby eliminating coma. Furthermore, since the CRT image plane is curved, each array of lens elements is preferably angled to follow the curvature of the CRT image. In order to use identical lens elements, the separation between the CRT image plane and the RP image plane must be kept equidistant by following the same curvature.

Although one could use a number of alternative RP screens in the VMX system, one particular RP screen construction appears preferred to obtain the various desirable corrections to plane screen geometry described in the preceding paragraph. The preferred RP screen construction is a relatively thin (of the order of 1") fiber-optic plate using optical fibers in the order of 100 microns in diameter. Such a screen can be shaped in the back, the side facing the lens array, while remaining flat on the side viewed by the audience.

The fiber ends of the fiber-optic plate, as well as the surface of the plate facing the viewer, are preferably finished and shaped so that the image can be viewed over a wide angle by the audience, without appearing dimmer or uneven, at various angles of viewing, and also that the screen has a very good capability to reject ambient light. Both of these properties of an RP screen are important in audiovisual applications.

FIG. 11 represents graphically a preferred configuration of a VMX system having a curved CRT image plane 30, a curved inside surface of the RP screen 31 and having curved field correction cavities formed into the rear of the RP screen corresponding to each lens element of the lenticular plate. The optical axes of the lens elements are all perpendicular to the CRT curve and the rear curve of the RP screen.

DIGITAL TELEVISION SIGNAL PROCESSING CIRCUITRY

The function of the digital processing circuitry is to accept an incoming NTSC television signal and to display it over an array of TV monitors so that the resulting image appears as it would on a single very large screen TV. This is called segmenting an image.

The electronic video controller system 100 accepts the incoming video signal and partitions and processes it for display on the monitor array. The image is partitioned into "segments", one segment for each monitor, and may be further partitioned into "sub-segments", with each sub-segment corresponding to a lens and with blank spaces between the sub-segments. For example, a 2×2 array will have the image partitioned into 4 segments and, if each lens plate has 12 lenses, the image would be partitioned into a total of 48 sub-segments. The basic problem in partitioning or segmenting a TV image is how to preserve the image fidelity while expanding it over a larger number of displayable lines and horizontal elements. The problem is compounded by the need to perform the computation required to route and process the images in real time. Preferably the system is capable of handling different array sizes.

The segmentation system is capable of accepting a single NTSC type video signal and dividing this single image into a displayable array covering 2×2, 3×3 or 4×4 television monitors. The segment on any individual monitor may be frozen, independent of the incoming signal, and the system is compatible with certain computer generated graphic images.

In order to cover the 2×2, 3×3 and 4×4 monitor array configurations while maintaining a reasonably clean system design, it is desirable to set the number of vertical and horizontal picture elements to a value which is divisible by the least common multiple of the array size, in this case 12. The number of vertical lines in a standard TV frame is 480, which meets the above criterion. The number of pixels to be sampled in each horizontal line is somewhat arbitrary; a larger number provides better resolution at the cost of increased processing speed. A number which meets the above criterion and which is reasonable from both the resolution and processing standpoints is 768 pixels per line. The 768 pixel per line sample is about (14.318 Mhz), which is 4 times the color subcarrier frequency exceeding the Nyquist Sampling Criterion by a fairly comfortable factor of two.

In terms of computer generated graphic images there is available the IBM PC graphics adapter (640×200) and similar extended graphics adapter (640×480). The pixel clock, which is the relevant parameter, for these products is 14.31818 Mhz. Use of this clock rate for sampling of the MTSC video information permits pseudo synchronous operation of the video segmentation system with these computer graphics products.

The active portion of a video line of information is displayed in an interval of about 54 microseconds. Given a sampling of 14.31818 Mhz, 773 video samples can be acquired in this time of 54 microseconds. In order that the image be segmented into segments which can be individually frozen, the system preferably allows for selection of image storage elements within the image memory with boundaries identical to those associated with 2×2, 3×3 and 4×4 monitor arrays. Alternatively, but not preferably, each monitor output channel may be provided with an individual sub-frame of storage.

The incoming NTSC signal provides a complete video image typically each 1/30th of a second. The system 100 produces N (4,9,16 . . . ) processed image segments and N' sub-segments (e.g. 48,108,192 . . .) in the same 1/30th of a second. Each segment contains the same number of lines as the original image. The process for performing this type of function is known as "scan conversion and interpolation". Scan conversion is the production of information at a rate different from that at which it is acquired. Interpolation is the provision of a finer grain in the information output than is present in the input. This general technique of scan conversion and interpolation is used in acquisition and display systems for medical imaging and military imaging applications.

Figure 12:
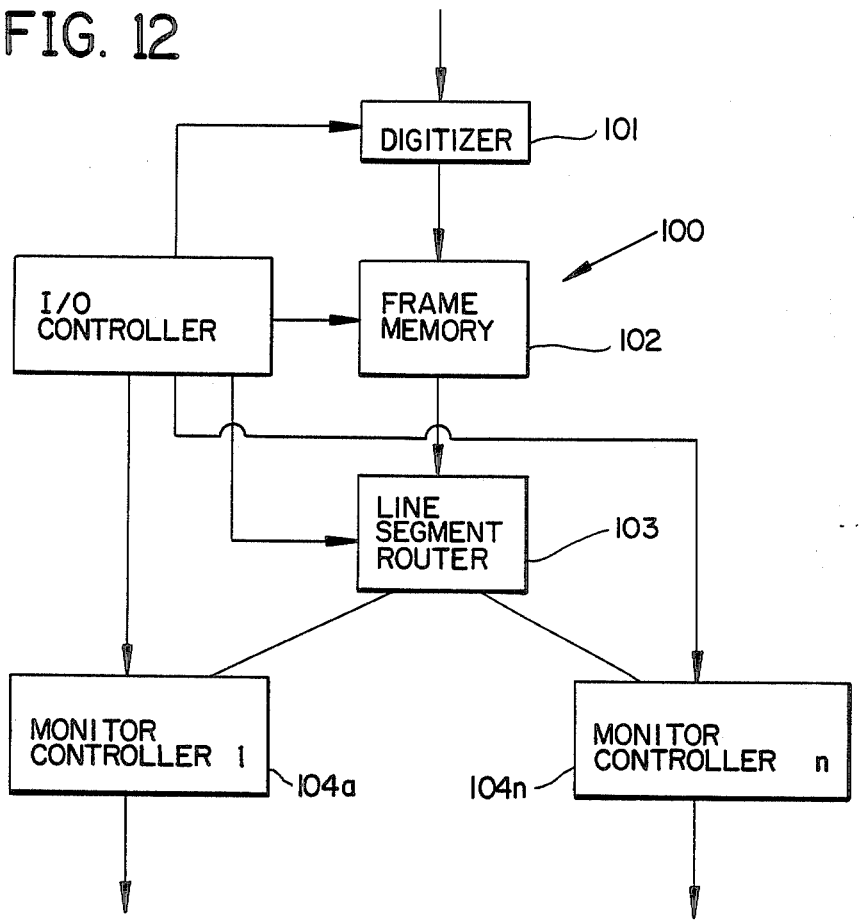
FIG. 12 is a block diagram of the digital television signal processing icrcuitry utilized in the present invention.

The digital scan conversion and interpolation video processing system 100 is shown in FIG. 12. This system 100 consists of four discrete modules: the NTSC converter and digitizer 101; the frame memory 102; the line segment router 103; and the output converters 104a . . . 104n.

The function of each module is described below:

The NTSC converter and digitizer 101 converts the incoming NTSC video signal to a stripped, Dc restored video and sync form. It digitizes the video signal in time synchronization with the stripped sync signal and passes the resulting image data to the frame memory 102. The data is stored in frame memory 102 (a digital storage system, perferably a high-speed solid-state memory) as sequential image lines taking into account the interlaced nature of the NTSC signal.

The frame memory 102 acts as a data storage device for a full frame of video data, consisting of two interlaced fields each containing 240 lines of information.

The line segment router 103 extracts segments of video lines from frame memory 102 and routes these line segments, appropriately, to a number of output converters 104a . . . 104n, one of which is associated with each video monitor displaying some portion of the desired image.

The output converters take the line data and perform the necessary interpolation and digital-to-analog functions to produce an RS-170 (RGB+SYNC) video signal to drive the individual TV monitors.

In the system 100 the line segment router 103 and the output converter 104 are programmable to accommodate the multiplicity of display monitor array sizes.

Video images are conventionally generated in an interlaced fashion wherein every other line in the image frame is generated during one field interval and the alternative lines are generated during the next field interval. If each frame of video information is written to a memory and read out, for example, onto a 2×2 array of monitors, with the writing and reading process beginning at the top of each image and proceeding to the bottom of the image, the writing process will overtake the reading process almost immediately on the top row of monitors and again ¾ the way down the image (in the center of the bottom row of monitors). The implications are that the information contributing to the ¼ of the image beginning at the top of the lower row of monitors will be out of time sync with the remainder of the image by as much as 1 frame interval, depending on motion, which is clearly unacceptable.

Figure 13:
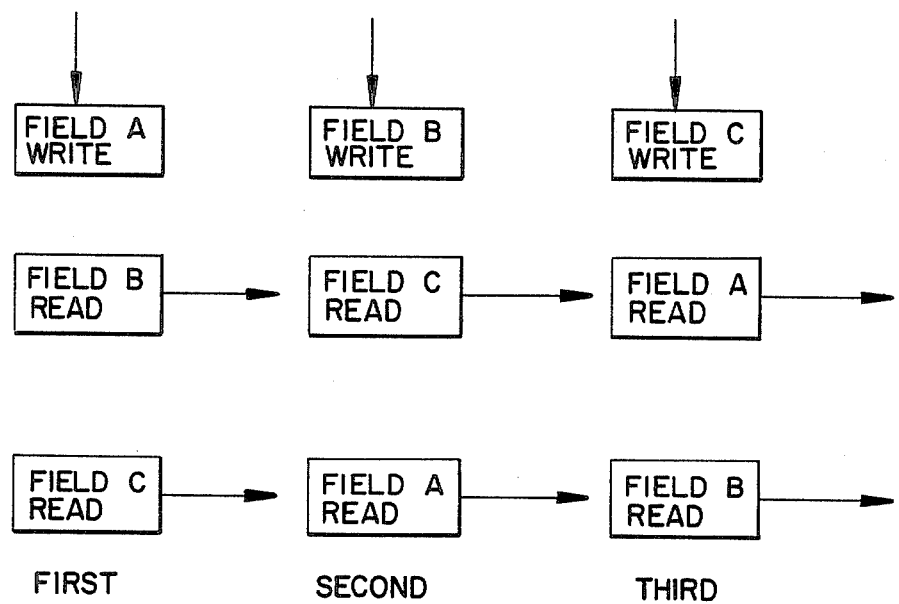
FIG. 13 is a schematic diagram showing the steps of the 3-field queue system.

The preferred solution to this problem, considering also the previous constraints, shown in FIG. 13, is to provide a rotating 3-field queue in which the image output to the monitor array comes from 2 static fields of memory data 111,112 while the input field is stored in the 3rd memory 110. This will inject a 1/60th second (1 field) delay between the incoming information and the display, a "video field pipeline".

This rotating queue reduces the required bandwidth of the individual memories since they do not have to support simultaneous read and write operations. This significantly reduces I/O buffering in the system.

Preferably, the system has a 3-field computer storage memory, each field being 768×240 pixels or 552960 individual pixels. On this basis, assuming a minimum of 6 bits per color per pixel, the minimum memory configuration is in excess of 10 million bits for the three fields of memory and for three colors (13.5 Mbits if 8 bits are used in each color channel).

There are presently available state of the art "video access memories". Video access memories are characterized by a serial access port through which the video data can be input and output independently of other memory signaling and timing requirements. The present state of the art in these components is a 64k×4 device solid state integrated random access memory circuit ("RAM chip") with an internal 256×4 serial access buffer. Suitable devices are Hitachi (HM53461 or HM53462), Fujitsu (MB81461), and Mitsubishi (M5M4C264).

The video data is accessed via the serial access port, which is the intent of these video access memory circuits. The entire serial buffer must be transferred to the memory array (video acess memory circuit) at one time, so the system memory design allows for a 2,3,4 configuration for horizontal serial acess so that any individual monitor may be frozen. Further, since in the 2×2 monitor system, each horizontal line segment consists of 384 pixels and the memories can contain at most 256 pixels from a single video line, multiple (2) memory devices are required to be accessible as a single line store.

Figure 14:
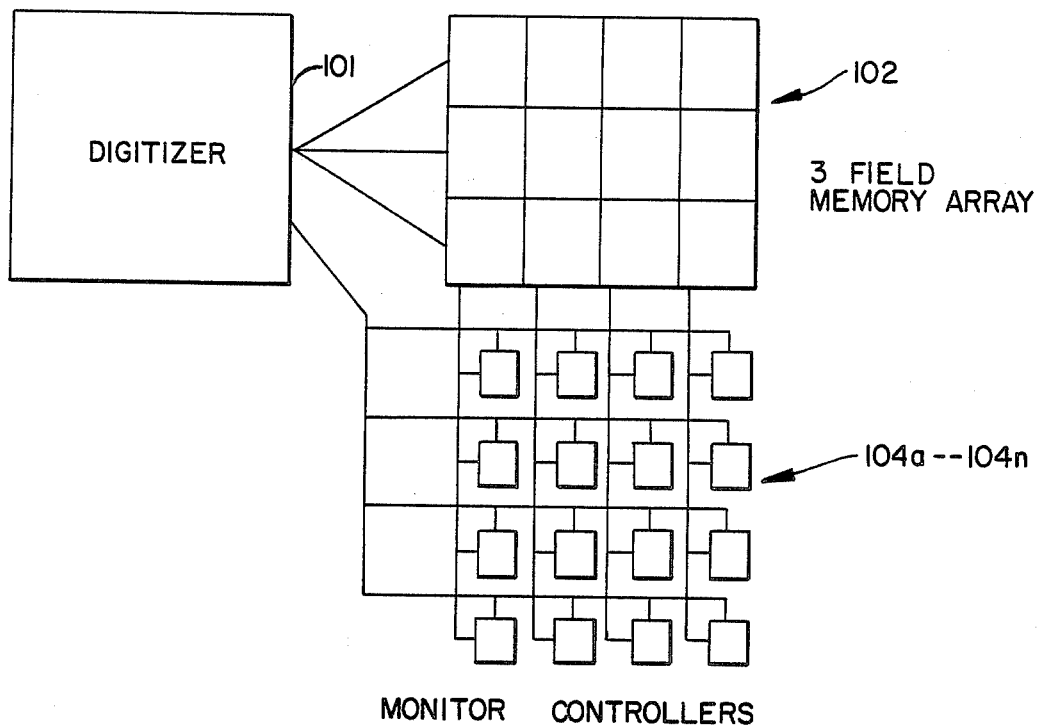
FIG. 14 is a block circuit diagram of the 3-field memory array.

With these factors in mind and assuming use of the aforementioned memory components, a single centralized image store is preferred and may be compared on an efficiency basis with a distributed per monitor image store. The sufficiency of a centralized image store based on use of one of the above-mentioned video acess memories is shown with reference to FIG. 14. The memory array is divided vertically into 3 field and horizontally into 4 segments, as shown in FIG. 14, each of which serves a column of monitor controllers. Each memory cell in the array is capable of storing 256×256 pixels for each color (6 of the above components each of which is 64K×4 or 256K). In the 4×4 configuration connection is as described and each memory holds 192×240 pixels.

In the 3×3 configuration the upper-left 3×3 array of monitor controllers are used and each memory holds 256×240 pixels, which is the most efficient memory usage. In the 2×2 configuration, columns of memories are paired, each pair serving a column of monitor controllers and holding 384×240 pixels.

The 3 fields of memory are managed by the I/O controller such that the first field ("Field I") is fed by the digitizer (analog to digital converter) and the remaining two fields are read out to produce the active image frame. To avoid buffering, the input transfer rate from the digitizer is 14.31818 Mhz (the same as the sampling rate) which is one pixel in approximately each 70 ns. The serial data interval for the selected memories is between 40 and 60 ns, so the centralized memory configuration provides nearly an optimal input channel.

Assuming that each monitor will require a new line of video information for each line displayed (worst case). Then, as above:

for the 4×4 configuration each column serving memory will make 4×192 pixel transfers per video line (63.55 us microseconds).

for the 3×3 configuration each column serving memory will make 3×256 pixel transfers per video line (63.55 us).

for the 2×2 configuration each column serving memory will make 2×384 pixel transfers per video line (63.55 us).

Note that the column serving centralized memory system balances the bandwidth in all configurations, requiring 768 pixel transfers per line per column serving memory. Actually, the 4×4 configuration presents the greatest burden on the system since each 192 pixel transfer will incur line segment address and access overhead.

If the output data transfer is set to 14.31818 Mhz, then the total time required for serial transfer is 70 ns×768 or 53.75 us. Overhead associated with a segment transfer can be held to under 1 us so that of the 63.55 us available, 57.75 us is used. The remaining time is typically used for other system overhead.

The centralized image store based system has sufficient bandwidth to accommodate all required transfers. It also accommodates image segment freeze since line segmentation takes place at the border of the column serving memories, and the I/O controller may inhibit a write data transfer to a selected column over the range of horizontal line addresses associated with a given monitor.

To compare the memory efficiency of the preferred centralized image store based system described above with optimal efficiency to that of the local monitor memory, consider the following: The optimal efficiency for 8 bits per color per pixel is about 13.5M bits of storage. The centralized memory system described above uses 18.9M bits achieving about 71% efficiency.

A 2×2 monitor configuration would use the largest amount of memory per monitor in a similar arrangement to to FIG. 1, about 9.4M bits. Given that 4 such memories would be used in a system, the total usage would be 37.6M bits with an efficiency of about 35%. The efficiency of a per monitor system degrades in the 3×3 and 4×4 monitor configurations.

The preferred and above-described centralized image store based system is highly efficient and is at least a factor of 2 better than the alternative and non-preferred per monitor storage arrangement.

The choice of 768 pixels per video line allows for each division by 2,3,4, using the best available memory components. This choice is a near-perfect match to the sampling frequency needed for acquisiton of computer generated video (computer generated graphic images).

Having selected a memory architecture, a physical system partition which permits efficient connection of this memory to the input and output channels is determined. The memory must be partitioned since only about ⅓ of the necessary comonents can be fit on a reasonable size circuit board. The choices for memory partitioning include:

By color, 3 memories, one for each, RED, GREEN, BLUE.

By field, 3 memories, one for each field in the queue.

By column of monitors, 4 memories, one for each column.

The partition by monitor column requires a 24-bit input bus for the full 3-color digital video stream, and a 24-bit output bus to service a single column of monitor controllers. Since the monitor controllers for a single column can be grouped with the associated central memory, the 24-bit output bus need only run the distance to the next 4 subsystems so that the physical space taken by the output bus in this case is far less than in the alternative systems. This partition is preferred for the video segmentation system design.

With this system of partition by column of monitors, the physical system consists of a digitizer (analog to digital converter)-I/O controller (input/output controller), 4 memory modules (3 for 3×3) and either 4, 9 or 16 monitor controllers, depending on the monitor array. The digitizer transmits a b 24-bit color digital video stream to each of the memory modules. The memories are connected to columns of monitor controllers which are located adjacent to them and transmit time multiplexed 24-bit digital video to each of the monitor controllers in the associated column. The I/O controller sends address and control signals to the memory modules for reading and writing of video data, and line segment routing and synchronization signals to the monitor controllers.

A breakdown of signals flowing in the system is as follows:

24-bit input digital color video from the digitizer to each memory module. Data from the left of the screen goes to the first memory, from the second vertical video segment to the second memory, and so on, with data from the rightmost video segment going to the last memory.

24-bit output digital color video from the memory memory modules to the associated column monitor controllers.

Memory address and control signals from the I/O controller to each of the memory modules.

Destination routing signals from the I/O controller to the monitor controllers (output converters 1- through n of FIG. 12).

Horizontal and vertical video sync signals from the I/O controller to the monitor controllers for generation of synchronization for the attached monitors.

Write clock signals generated by the I/O controller to effect the synchronous transfer of video data from the digitizer to the memory modules.

A read clock signal generated by the I/O controller to effect the synchronous transfer of video data from the memory modules to the monitor controllers.

A master 14.31818 Mhz clock signal from the I/O controller to the individual monitor controllers for clocked transfer of data to the attached monitors.

With respect to the memory address signals, the I/O controller can address any single column module or any combination (including none) of modules via 4 distinct column memory select signals. Further, the I/O controller can address any single field of each memory module or combination of fields via 3 distinct field select signals. Finally, the I/O controller can address any single video line within a memory module via an 8-bit line select address. (There are only 240 active lines in an NTSC video field, so 8 bits of line address plus the field selection is sufficient to access any of the 480 active lines in an NTSC fideo frame.)

Control signals from the I/O controller to the memory modules include a read/write signal for commanding the direction of data transfer and a number of other signals which are specific to control of the selected memory components. The I/O controller can route a video line from the memory module(s) associated with each column of monitors to any or all of the monitor controllers in that column via 4 distinct controller destination select signals. There is a single read clock signal in the system for effecting synchronous data transfers from the column memories to the monitor controllers.

There are 4 write clock signals in the system, one for each column memory module, for effecting synchronous data transfers from the digitizer to the memory modules.

In a normal application, the video data flows through the system as follows:

During a given field of video coming from an NTSC video source (1/60th of a second) one of the 3 fields of memory in each memory module is selected for write transfers. The other two fields of memory are selected for read transfers. At the end of each field, the write selected field is advanced to the next field memory, see FIG. 13.

During each horizontal video line, 768 pixels are synchronously transferred from the digitizer to the 4 three-column memory modules from left to right across the video line. Transfer to a given column memory module is effected by activation of the associated write clock signal. The write clock associated with the leftmost column memory is activated first, the write clock with the second column memory next, and so on. In the 4×4 system, for instance, 192 clock pulses are directed to each module in succession, for a total of 192×4, or 768, clock pulses. At the end of the horizontal line, the pixels which have been transferred to the memory modules are written to the appropriate horizontal line address within the memory components.

During each horizontal video line, 768 pixels are synchronously transferred from each column memory to the associated monitor controllers. These are transferred in segments of size appropriate to the system configuration. For instance, in the 4×4 configuration, the segment size is 192 pixels, so that a 192 length line segment from the top of video memory is transferred to the monitor controller associated with the top of the video image, and so on, for the 4-monitor controllers in that column. These transfers are effected by activation of the read clock signal for a number of cycles equal to the line segment size, e.g., 192. Reading of the proper line segment for a given horizontal line for a given monitor controller from the memory modules is effected by the I/O controller through the previously mentioned address and control signals. A unique read operation for the desired line segment precedes each line segment transfer.

Figure 15:
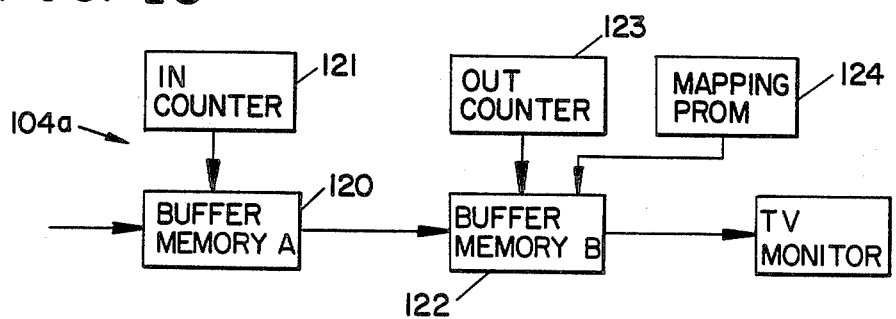
FIG. 15 is a block circuit diagram of a monitor controller.

The transfer of line segment from the memory modules to the monitor controllers cannot proceed in synchrony with the required video stream to the individual monitors. This is because the memory modules can service only one monitor controller at a time and the video stream to the monitors must be continuous. To overcome this problem, the monitor controllers each contain two line segment buffer memories 120,122 (FIG. 15) one of which 120 receives a line segment from the associated column memory module while the alternate one 122 reads out the previously received line segment in synchrony with the required video stream for the attached monitor. Memory 120 is controlled by in-counter 121 and memory 122 is controlled by out-counter 122.

To provide for insertion of blank lines between sub-segments in an image on an individual monitor, the I/O controller would access none of the memory modules while effecting a transfer to the monitor controllers. For insertion of blank pixels between subsegments on an individual monitor, each monitor controller is equipped with an output address mapping PROM memory 124 such that pixels for output can be addressed in arbitrary order at arbitrary times, backward in order to invert each sub-segment right to left, during the horizontal output line transfer (synchronous with the master clock) and such that a blanking signal can be inserted anywhere within a video line. The monitor controller mapping PROM may be programmed to accommodate any desired horizontal output format. For example, for a subsegment it will take pixels ordered 1,2 ... 10 and re-order them in an output format of 5,4,3,2,1, blank, blank, 10,9,8,7,6. Similarly, it may invert (re-order) the lines to invert the subsegment images upside down.

Some special features of I/O controller not directly linked to the basic system are as follows:

The input channel and output channels are synchronized vertically and horizontally to the incoming video signal. If this synchronization is lost, the image is frozen and vertical and horizontal sync are supplied from an auxiliary sync generator.

For a given system configuration, the address information for direction of line segments from the central memory to the monitor controllers, and indeed for input from the digitizer, will be contained in EPROM (Erasable Programmable Read Only Memory) permitting easy system reconfiguration for different image formats. In this application, identical address information is required for each of the solumn serving memories, and a simple signal channel controller is sufficient.

The EPROM based I/O controller also provides for management of the 3-field queue and for memory sequencing.

The feature of the monitor controllers which is independent of the core system function is image enhancement. In the 2×2 configuration, all video lines required by the display are present in the incoming NTSC signal and simple interpolation of pixels across each line is performed in the monitor controllers to provide a more continous image appearance. For the 3×3 and 4×4 system configurations fewer lines are present in the NTSC signal than are required for generation of the display image. In this case line interpolation and/or neighborhood operator processing may be used to fill in "missing" display image data.

What is claimed is:

1. A large screen video display system to display video images comprising:
   a plurality of at least four video monitors arranged adjacent each other to form an array of said monitors, each of said monitors having a face plate upon which a video image appears;
   a plurality of lenticular optical plates each plate comprising a plurality of lens elements positioned side-by-side to form a plate of lens elements, one of said lenticular optical plates being positioned in front of the face plate of each of said respective video monitors;
   segment circuit means to divide an original video image into segments so that each segment is displayed on a respective one of said video monitors;
   sub-segment circuit means to divide each of said segments into a plurality of video image sub-segments, which sub-segments are displayed on each of said respective video monitors, the said sub-segments corresponding in location and number to the lens elements of the respective optical plate corresponding to the monitor on which the sub-segments are displayed; and
   a rear projection screen having a rear surface and a front surface upon which the final image to be viewed appears, the said lens elements forming images on said rear surface, which images are combined on said screen to form a unitary video image.

2. A video display system as in claim 1, wherein each of said sub-segments on a monitor face plate is rotated by 180° from its image when viewed on the front of said screen.

3. A video display system as in claim 1 wherein the array is an array of four monitors arranged in two rows and two columns.

4. A video display system as in claim 1 wherein the array is an array of nine monitors arranged in three rows and three columns.

5. A video display system as in claim 1 wherein each monitor has an imaginary central optical axis and the said lens elements each have an optical axis arranged, except at the center lens element, at an angle with respect to the said monitor central optical axis.

6. A video display system as in claim 1 wherein each optical lens element magnifies an image on the face plate in the range of 1.1 to 1.5.

7. A video display system as in claim 1 wherein each sub-segment is separated from its adjoining sub-segments by a non-image gap (blank space).

8. A large screen video display system to display video images comprising:
   a plurality of at least four video monitors arranged adjacent each other and abutting each other to form a rectangular array of said monitors, each of said monitors having a curved face plate upon which a video image appears;
   a plurality of lenticular optical plates each plate comprising a plurality of lens elements which magnify in focus in the range of magnification of 1.1 to 1.5 and positioned side-by-side to form a plate of lens elements, one of said lenticular optical plates being positioned in front of the face plate of each of said respective video monitors;
   segment circuit means to divide an original video image into segments so that each segment is displayed on a respective one of said video monitors;
   sub-segment circuit means to divide each of said segments into a plurality of video image sub-segments, which sub-segments are displayed rotated by 180° on each of said respective video monitors, the said sub-segments corresponding in location and number to the lens elements of the respective optical plate corresponding to the monitor on which the sub-segments are displayed; and
   a curved rear projection screen having a rear surface and a front surface upon which the final image to be viewed appears, the said lens elements forming images on said rear surface, which images are combined on said screen to form a unitary video image.

9. A video display system as in claim 8 wherein the array is an array of four monitors arranged in two rows and two columns.

10. A video display system as in claim 8 wherein the array is an array of nine monitors arranged in three rows and three columns.

11. A video display system as in claims 1 or 8 wherein the video monitors are cathode ray tube displays.

12. A video display system as in claims 1 or 8 wherein the video image displayed on each of the monitors is subsegmented into a mosaic of rectangles and each element is a non-inverting projecting lens.

13. A video display system as in claims 1 or 8 wherein the rear projection screen consists of a thin fiber optic plate with two plane parallel faces.

14. A video display system as in claims 1 or 8 wherein the rear projection screen consists of a thin fiber optic plate with a plane front face on the audience side and a curved rear surface to correct for monitor image curvature and projected image field curvature.

15. A video display system as in claims 1 or 8 wherein the video monitor image display elements are video imaging signals.

* * * * *